United States Patent [19]
Renzelmann

[11] Patent Number: 5,201,479
[45] Date of Patent: Apr. 13, 1993

[54] SELF-MONITORING LATCH PIN LOCK FOR FOLDING WING AIRCRAFT

[75] Inventor: Michael E. Renzelmann, Woodinville, Wash.

[73] Assignee: The Boeing Company, Seattle, Wash.

[21] Appl. No.: 828,308

[22] Filed: Jan. 30, 1992

[51] Int. Cl.[5] ............................................. B64C 3/56
[52] U.S. Cl. .................................... 244/49; 244/7 C; 244/56
[58] Field of Search ................ 244/49, 1 R, 124, 131, 244/7 C, 56, 117 R, 102 SL; 16/249, 329, 331

[56] References Cited

U.S. PATENT DOCUMENTS

| | | | |
|---|---|---|---|
| 2,112,421 | 7/1955 | Naumann | 244/49 |
| 2,280,809 | 4/1942 | Evans | 116/124 |
| 2,320,849 | 6/1943 | Claybourn et al. | 70/265 |
| 2,397,526 | 4/1946 | Bonbright | 244/49 |
| 2,925,233 | 2/1960 | Dunn et al. | 244/49 |
| 4,778,129 | 10/1988 | Byford | 244/49 |

FOREIGN PATENT DOCUMENTS 587158 5/1932 Fed. Rep. of Germany.
888367 7/1953 Fed. Rep. of Germany.

Primary Examiner—Joseph F. Peters, Jr.
Assistant Examiner—Christopher P. Ellis
Attorney, Agent, or Firm—Bruce A. Kaser

[57] ABSTRACT

A latch pin and locking system for use in connection with an aircraft having folding wings or wing tips. The system includes a plurality of individual latch pin units, each of which has a pin that is hydraulically driven in extension and retraction. When extended, the pins cooperatively lock wing tip hinge structure which prevents wing tip folding movement. Each latch pin unit has a locking body that prevents pin retraction of its respective pin after extension thereof for wing tip locking. The locking bodies of all of the latch pin units are drivingly interlinked, so that all lock and/or unlock as a single network. The network is driven by a single power drive unit. In the event any one locking body in the network fails, the network is broken, and thereby provides an indication that maintenance is required.

9 Claims, 17 Drawing Sheets

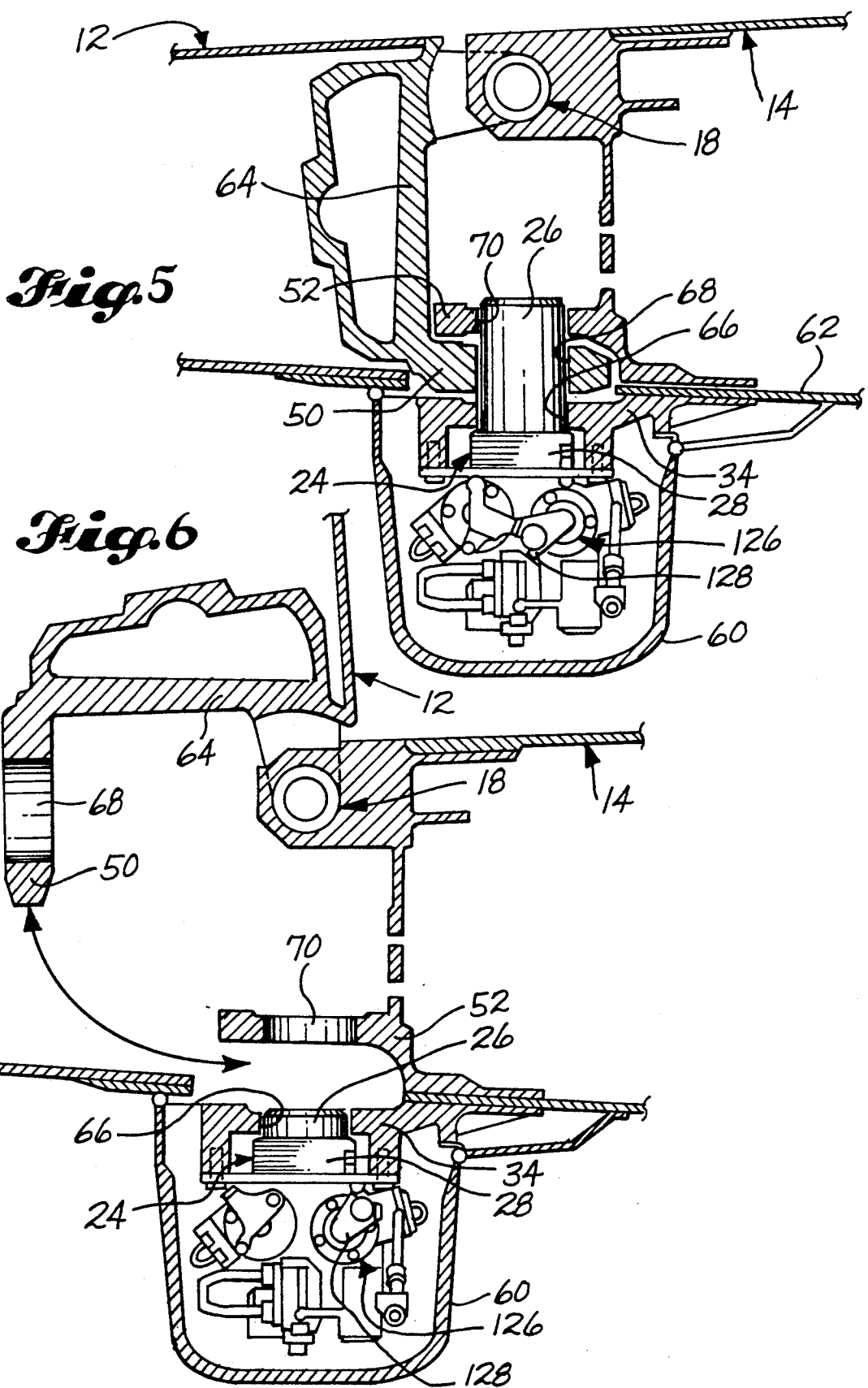

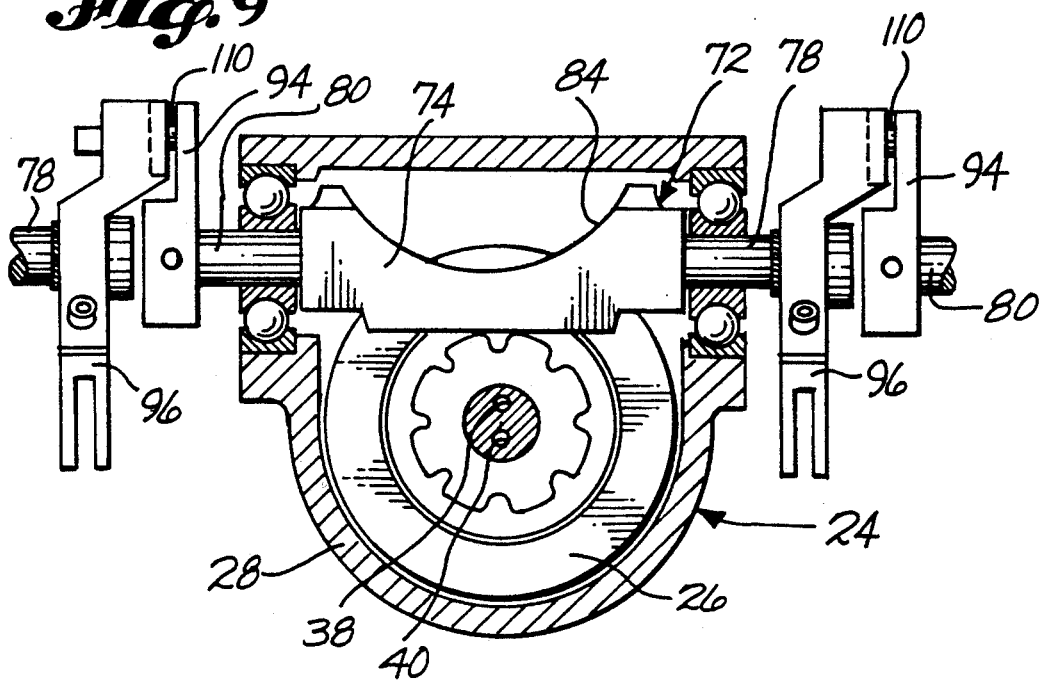
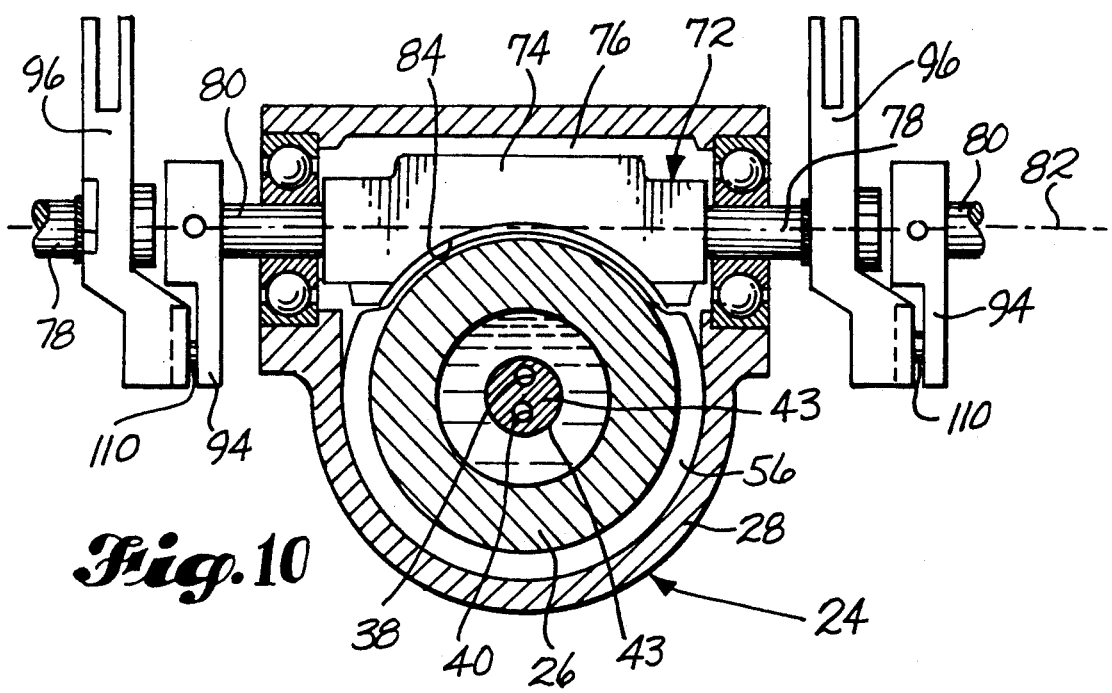

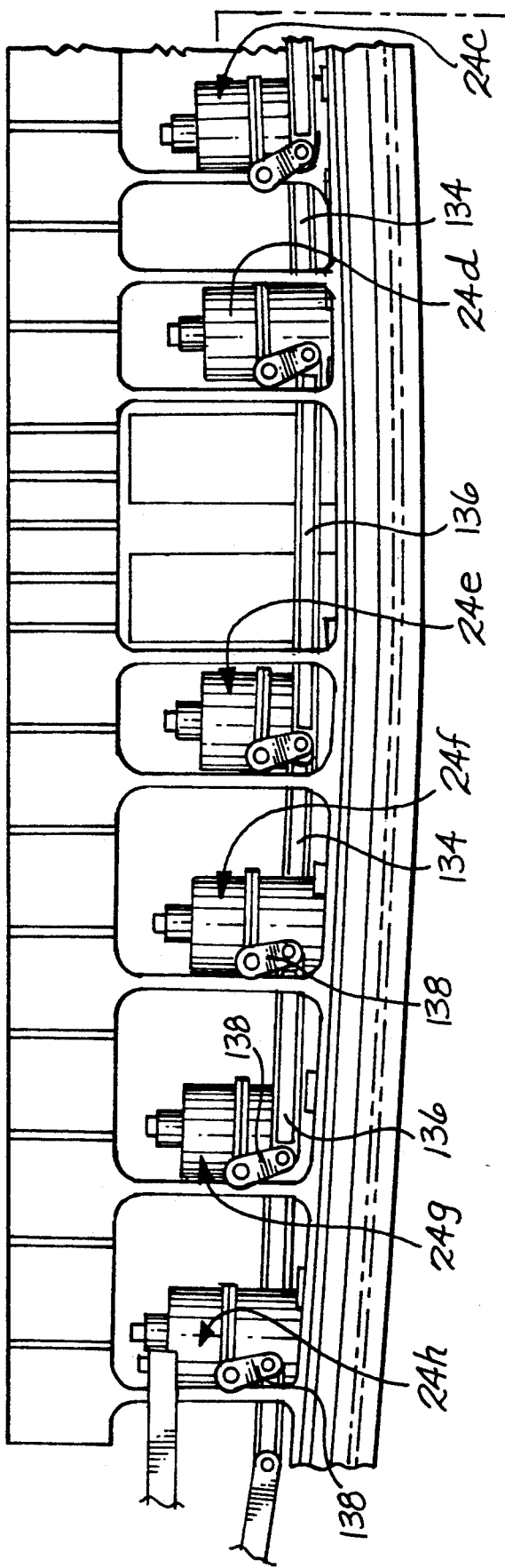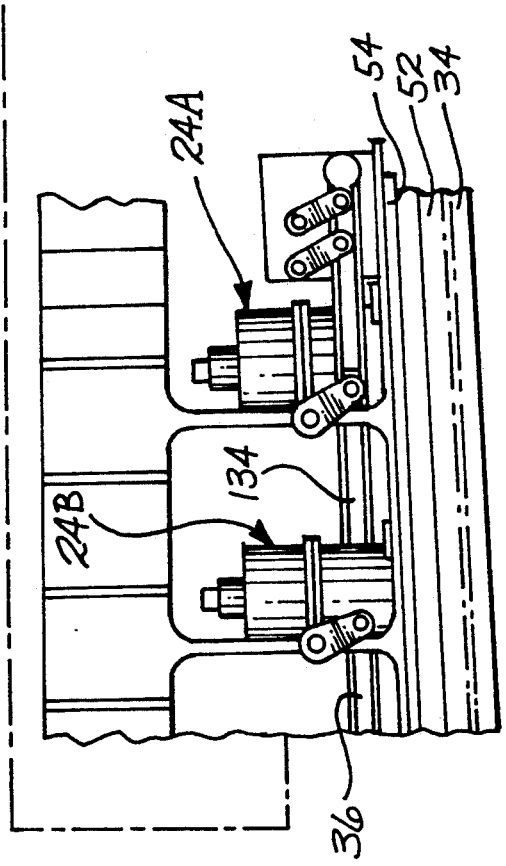
Fig. 19

SELF-MONITORING LATCH PIN LOCK FOR FOLDING WING AIRCRAFT

TECHNICAL FIELD

This invention generally relates to aircraft that have folding wings or folding wing tips. More particularly, it relates to latching and locking mechanisms for folding wings.

BACKGROUND INFORMATION

When a person thinks of aircraft with folding wings, probably what most often comes to mind are fighter aircraft that are stationed on board aircraft carriers. Carrier-based aircraft must, by necessity, have folding wings that reduce their wing span for storage purposes. It goes without saying that an aircraft carrier has a small amount of flight deck and hanger space in comparison to ground-based facilities. Providing folding wings on carrier aircraft enables a larger number of planes to be based on a carrier than would otherwise be possible.

Because the same kinds of space considerations have not, at least in the past, applied to the utilization of commercial passenger aircraft or jets, there has been little or no need to have folding wings on these kinds of planes. In other words, the typical airport served by a passenger jet generally has plenty of space for aircraft maneuvering on the ground, and for parking and passenger ingress and egress. However, for reasons stated below, this may now be changing.

It is probably a fair statement to say that modern-day airline operation is linked to passenger demographics or ridership levels, and the ability of the commercial airlines to minimize the number of empty seats on board their various flights when moving passengers from one location to another. The number of people travelling a given route, during a given period of time, dictates the number of scheduled flights provided, and the size or model of jet that is used in providing such flights. Some airplane models are better suited for use on certain routes than others. In other words, a small jet may be better suited for a given route, taking into consideration the number of people who schedule flights along that route during a certain time period, while a larger jet may be more optimum for other routes. It appears that the general trend, given present ridership levels, is to use larger planes, and consequently, the airlines are increasing the size of the individual aircraft in their fleets.

Aircraft size alone, however, is not the only driving factor governing how to move a given passenger volume from point A to point B in the most efficient manner. The major airlines typically have a fixed number of passenger gates at each airport. As is well-known, many, or perhaps most, major airports in the United States have either been built or renovated during the last twenty or thirty years. During such building process, passenger gates were distanced from each other in a fashion that was generally considered to be optimal given the size and number of aircraft in use at the time. The problem with the present trend toward using larger aircraft is that they have much larger wing spans than the majority of aircraft in use twenty or thirty years ago. This results in a lesser number of airplanes taking up a fixed amount of parking or berth space around the typical terminal, and consequently, reduces the number of usable passenger gates. The end result is that larger airplanes tend to make it more difficult to accommodate airline scheduling that calls for a large volume of flights.

Consequently, it now appears that space restriction is becoming a problem in modern-day airports. One way to address this problem is suggested by the military aircraft carrier mentioned above. That is to say, more planes can be fit into a limited space if they are provided with folding wings.

It is well-known that The Boeing Company, who is the assignee of the invention disclosed and claimed here, is presently developing a new model of commercial jet designated as the "777." This jet is larger than Boeing's earlier "767" model, and consequently, has a larger wing span. At least one study done by Boeing estimates that there are approximately one hundred thirty usable gates at six major airports for the Boeing 767 and the DC 10—10. However, only twenty or so of these same gates are suitable for use by the 777, because of its larger wing span.

Providing 777 jets with folding wing tips can enable a larger number of this particular airplane model to be parked or placed around a given terminal at the same time. It has been estimated that nearly as many usable gates would be available for a 777 that is modified in this way as are presently available for the 767 and DC 10.

A 777 with folding wing tips will have a latching and locking system for releasably interlocking the wing tip with the inboard portion of each wing. Safety considerations dictate that such system must have the utmost structural integrity and fail-safe operation. As the skilled person would realize, an aircraft with folding wings presents additional design and safety problems that are not present on aircraft with conventional wings. It goes without saying that the wings must be designed so that they do not accidentally fold during flight, and that the latching and locking mechanism does not falsely indicate "latched and locked" when that condition is not true.

In military aircraft, latch pins are used to hold each folding wing in place. These are locked by an independently-operated locking mechanism. The common method used to detect whether or not the latch pins are locked is a wing-mounted red "flag" that is driven above the wing contour by mechanical connections when the latch pins are unlocked. When they are locked, the flag is conversely driven below or flush with the wing contour. The pilot or flight crew determines the proper lock state by merely viewing the position of the flag. For high reliability, the flag is driven directly by the mechanism that locks the latch pins, with a minimum of interconnections. This necessitates physically locating the flag close to the locking mechanism.

Design safety for military aircraft is, by necessity, viewed differently than for civilian aircraft. Military operations typically require optimum airplane performance in order to provide the pilot with the best chance of survival. Military design anticipates that more pilots are lost as a result of combat than equipment failure. Hence, safety considerations are balanced with combat performance considerations. Since combat is not a consideration in the commercial arena, design safety takes on the utmost importance.

Although it has not been conclusively established, the above-described wing-locking technique used by the military may not provide the type of fail-safe operation that is required by the FAA for commercial aircraft, the FAA being the government agency that is responsible for closely regulating commercial aircraft design One known drawback to the military design is that the position of the flag does not necessarily provide an indication as to the integrity of the locking mechanism itself. That is to say, the flag may properly indicate that the wing's latch pins have been locked even though, in actual fact, the locking mechanism itself may be broken or otherwise damaged. Another drawback to the military design is that it is not particularly well-suited for most modern commercial jets, simply because the wings of such jets are not easily visible to the flight crew. Therefore, using a similar mechanical flagging technique in connection with the 777 wing would probably place an unacceptable operating burden on the airline that operates the plane.

The purpose of the present invention is to improve upon past latch pin and locking system designs used on military aircraft, and to produce a similar system that is highly reliable, and therefore suitable for civilian or commercial jet applications. How the invention accomplishes this, including the advantages it provides over and above prior art systems, will be explained below.

SUMMARY OF THE INVENTION

The invention described herein is adapted for use in connection with an aircraft having folding wings or folding wing tips. In other words, an end portion of each aircraft wing is hingedly connected to an inboard portion of the wing. For storage or parking purposes, the tip is swingable upwardly from an extended position to thereby reduce the total wing span of the aircraft. Prior to flight operations, the tip is folded downwardly, so that it, and the wing's inboard portion, together form a contiguous airfoil, The invention provides a latch pin and locking system for safely interlocking the wing tip with the inboard portion of the wing prior to flight. In preferred form, a plurality of side-by-side latch pin units are positioned in a row adjacent the hinge location where the wing tip is connected to the inboard portion. Each latch pin unit has a pin housing, and a latch pin that is slidably received within the housing. The latch pin is generally cylindrical in shape, and is reciprocatably movable between extended and retracted positions relative to the pin housing. When extended, the latch pins of all the units cooperatively interlock the wing's hinge structure, thus making the wing tip and inboard portion into a single, contiguous airfoil. When retracted, the hinge structure is unlatched for wing folding.

An inner end portion of the latch pin, which is slidably received within the pin housing of each unit, travels back and forth inside the pin housing in correspondence with pin extension and retraction. A locking body, or locking member, is also positioned inside the pin housing, and has a pin-blocking portion that is rotatable about an axis for latch pin locking and unlocking. The locking member is physically positioned such that, when the latch pin is fully extended outwardly relative to the pin housing, the pin-blocking portion of such member is then located immediately inwardly of the latch pin's inner end portion. Then, the pin-blocking portion is rotated into the locking position. The pin-blocking portion is arranged and shaped so that it is fully disposed in the path of latch pin travel. In other words, at least a portion of the body of the pin-blocking portion is fully within the path of retraction of the latch pin, and will stop retraction unless the pin-blocking portion is completely broken all the way through its thickness. Preferably, the pin-blocking portion of the locking body has a circular recess that is sized to have the same general curvature as the outer surface of the latch pin. When the pin-blocking portion is rotated into the unlocked position, such recess opens toward the latch pin, and provides a pathway that enables or permits the pin to pass by the pin-blocking portion as the latch pin retracts.

Although each latch pin unit has its own locking body, the locking bodies of all of the latch pin units are drivingly interconnected, in a manner so that all normally lock or unlock at the same time. Flange connections provide the means for connecting one locking body to another, as described below.

Each locking body has axial ends that extend outwardly from opposite sides of its respective pin housing. Each one of such ends is normally positioned across from and faces a like end of another locking body on an adjacent latch pin unit. A first flange member is connected to one of such ends, and a second flange member is connected to the adjacent end of the other unit. A pin extends between the two flange members, and thereby drivingly links them together, to form a chain of interlinked locking bodies.

In the event any one locking body fails, the chain of interlinked bodies is broken. Thus, not all of the latch pin units will lock or unlock, as the case may be, which would indicate a failed condition to the airline, and a corresponding requirement for maintenance. This mode of operation is further explained later in the portion of this specification which sets forth the best mode for carrying out the invention.

The latch pin and locking system generally summarized above, including the various features and advantages it has, will become more fully understood upon consideration of the written description which follows.

BRIEF DESCRIPTION OF THE DRAWINGS

In the drawings, like reference numerals and letters refer to like parts throughout the various views, and wherein:

FIG. 5 is a cross-sectional view of the hinge area shown in FIGS. 2-4, and shows a latch pin portion of a latch pin unit extended for hinge locking, and is taken along line 5—5 in FIG. 4;

FIG. 6 is a view like FIG. 5, but shows the latch pin portion retracted for wing tip folding;

FIG. 9 is a cross-sectional view of the latch pin unit shown in FIGS. 7 and 8, and is taken along line 9—9 in FIG. 7;

FIG. 10 is a view like FIG. 9, but shows the locking body rotated for unlocking the latch pin, and is taken along line 10—10 in FIG. 8;

FIG. 19 is a view similar to FIG. 4, but shows an alternative embodiment of the invention;

BEST MODE FOR CARRYING OUT THE INVENTION

Figure 1:
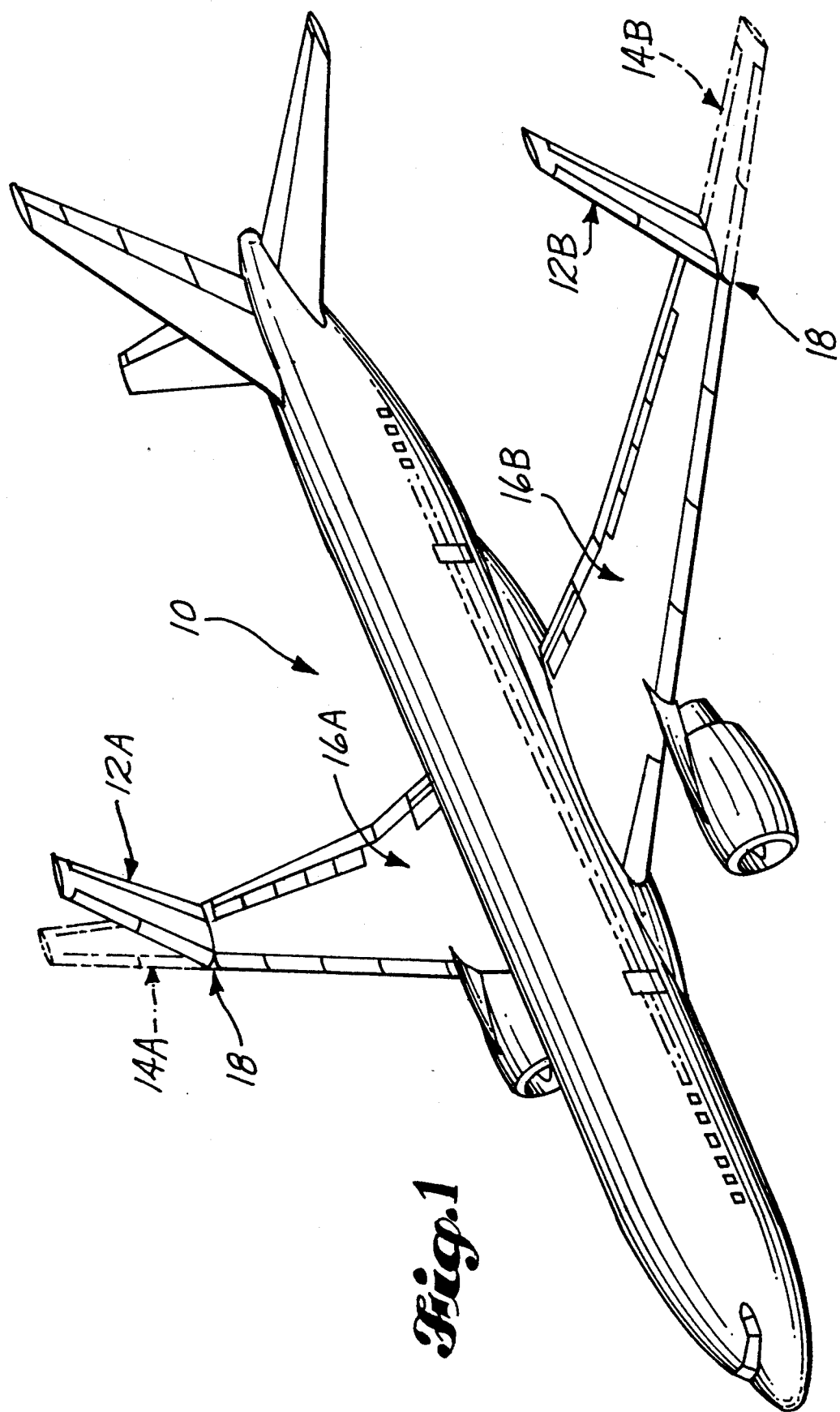
FIG. 1 is a pictorial view of a commercial jet having folding wing tips.

Referring first to FIG. 1, shown generally at 10 is a commercial jet airliner that is more or less conventional in configuration, except that it is provided with folding wing tips 12a, 12b. The solid lines show the wing tips 12a, 12b in an upwardly folded position, for taxiing and parking, to load and off load passengers at a conventional airport terminal.

The dashed lines 14a, 14b show the same wing tips folded down and locked into place with the wing inboard portions 16a, 16b for aircraft flight. The latching and lock system described here is to be used in conjunction with the kind of aircraft shown in FIG. 1, although it is to be understood that such system may be well-suited for use in other kinds of aircraft, including those having military applications.

Figure 2:
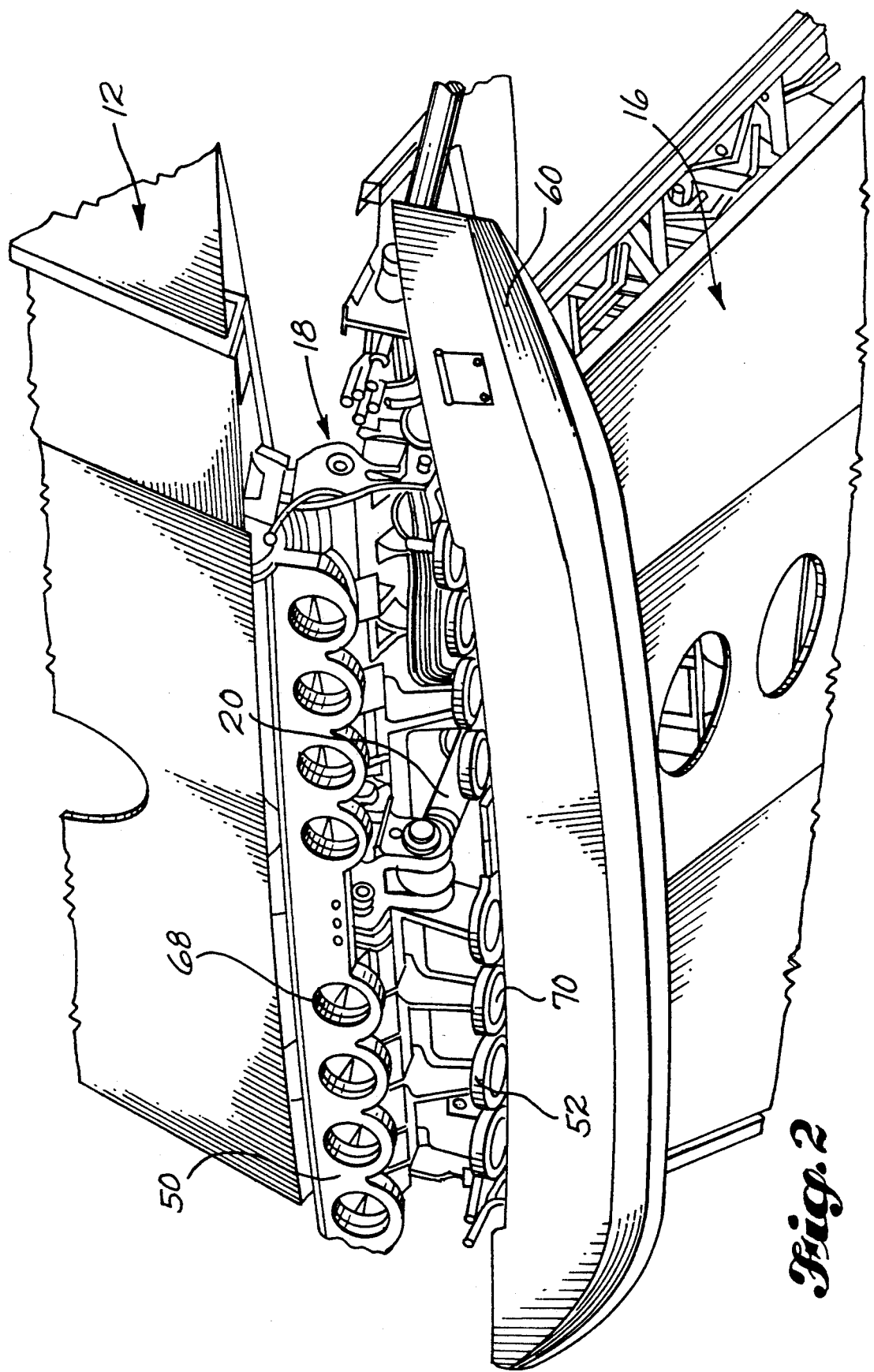
FIG. 2 is an enlarged view of the hinge area for one of the folding wing tips shown in FIG. 1.
Figure 3:
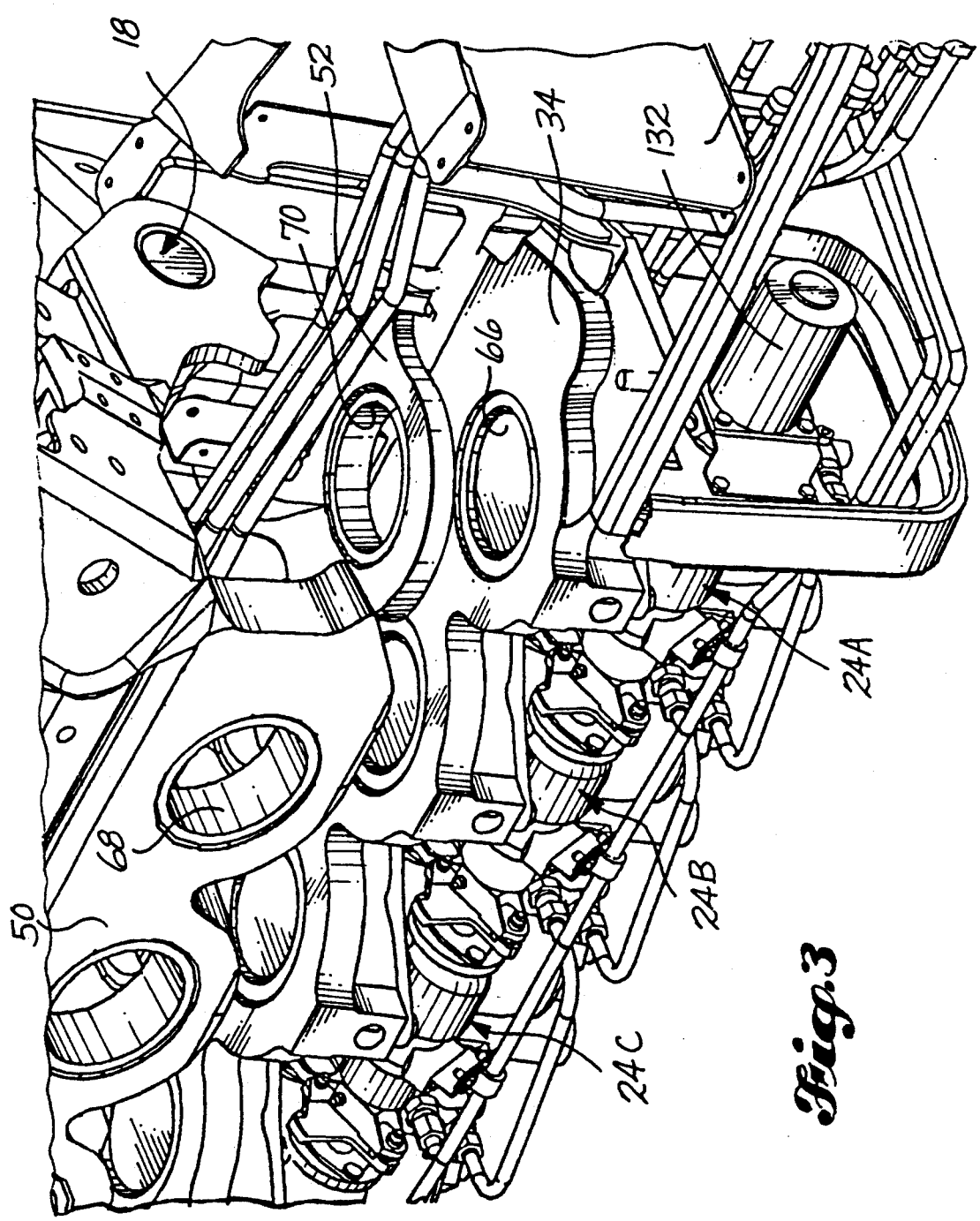
FIG. 3 is an enlarged, fragmentary view of a portion of the hinge area shown in FIG. 2.

Referring now to FIG. 2, the wing tip 12 is mounted to the inboard portion 16 Of the wing by a conventional hinge structure 18. Such structure is identical for either wing, although as the skilled person would realize, the hinge structure for one wing would probably be mirrored in the other, corresponding to the fact that one wing is left-handed while the other is right-handed. Since the construction of either wing is substantially the same, the letter subscripts "a" and "b" used above to indicate left and right-handedness are deleted in FIG. 2 and from the other FIGS.

Figure 13:
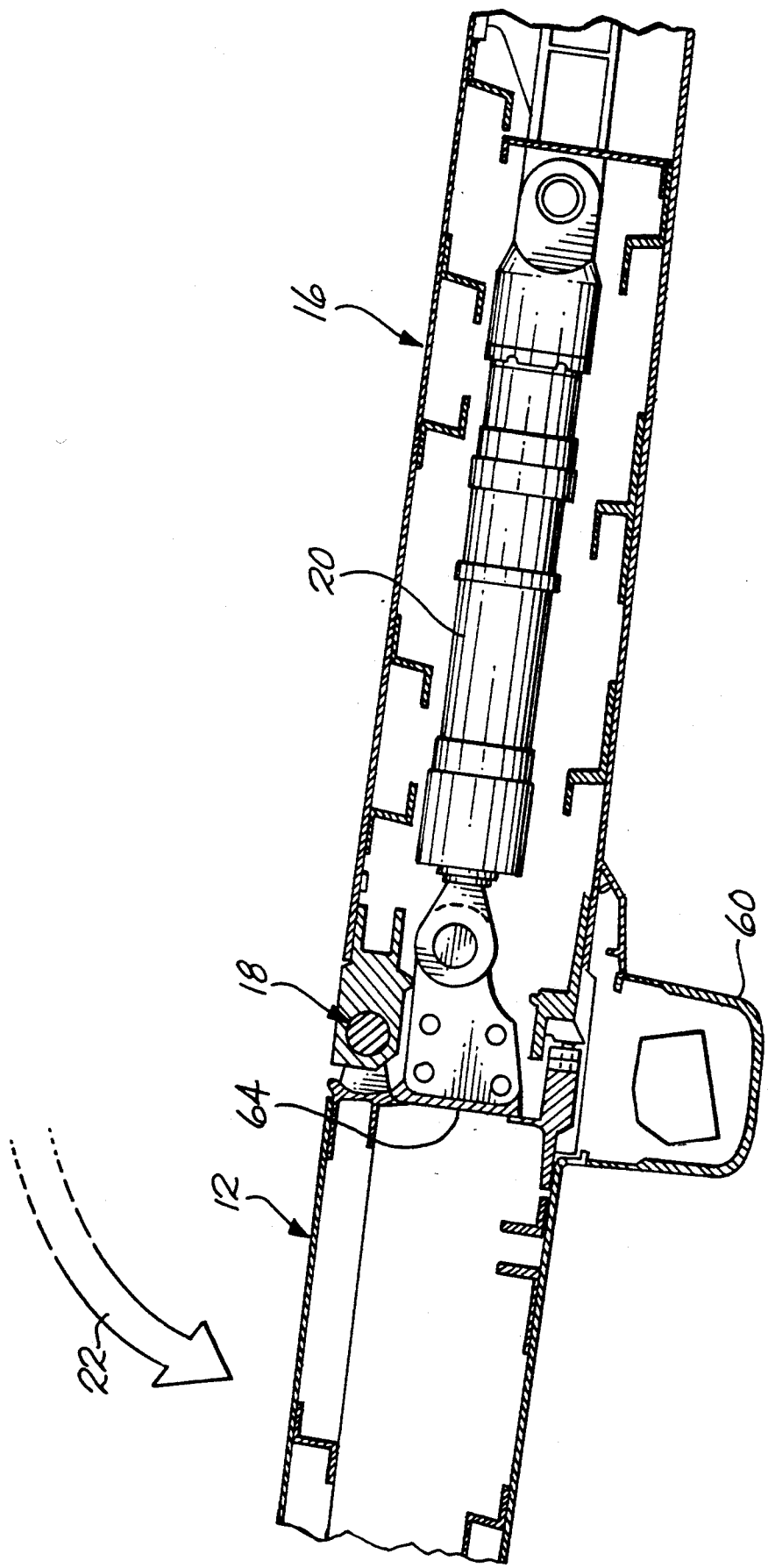
FIG. 13 is a side wing cross-section taken through a portion of the hinge area shown in FIG. 2, and shows a wing tip actuator for folding or unfolding the wing tip.
Figure 14:
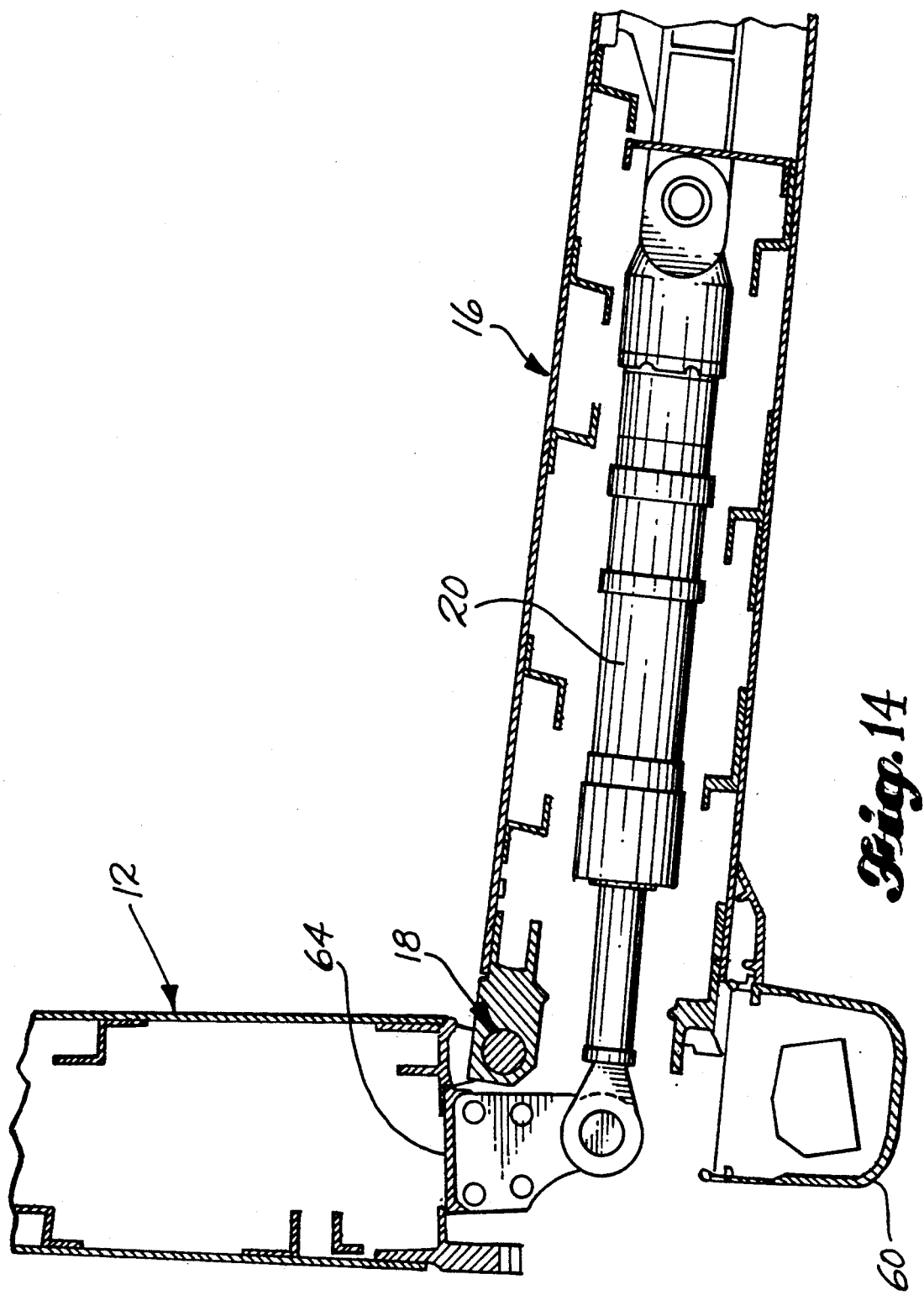
FIG. 14 is a view like FIG. 13, but shows the actuator in an extended condition for folding the wing tip.
Figure 16:
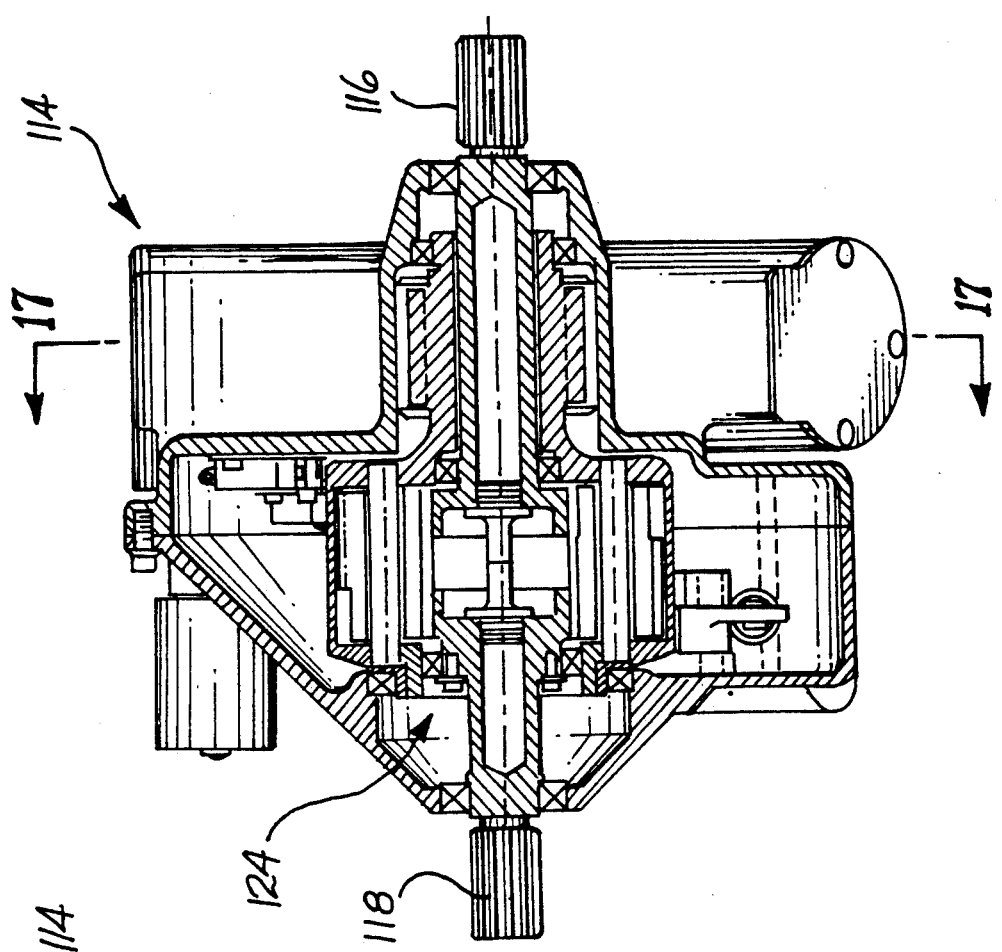
FIG. 16 is a cross-sectional view of the power drive unit shown in FIG. 15.
Figure 15:
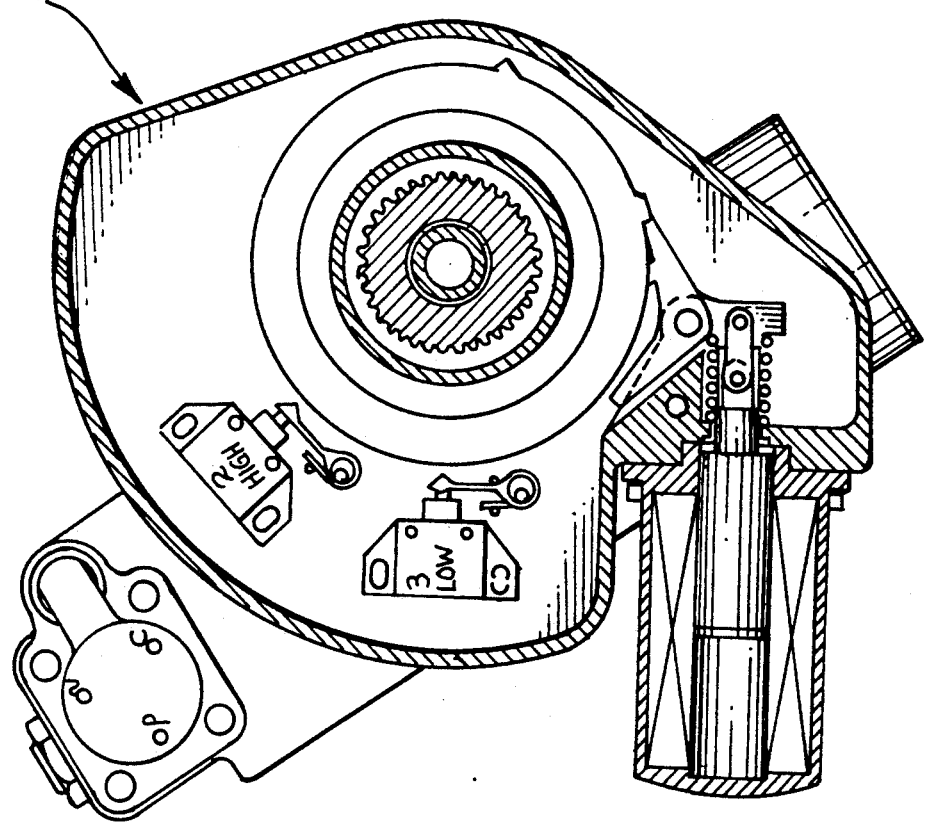
FIG. 15 is a side view of a lock actuator or power drive unit for locking and unlocking the various latch pin units shown in FIGS. 2-4.
Figure 18:
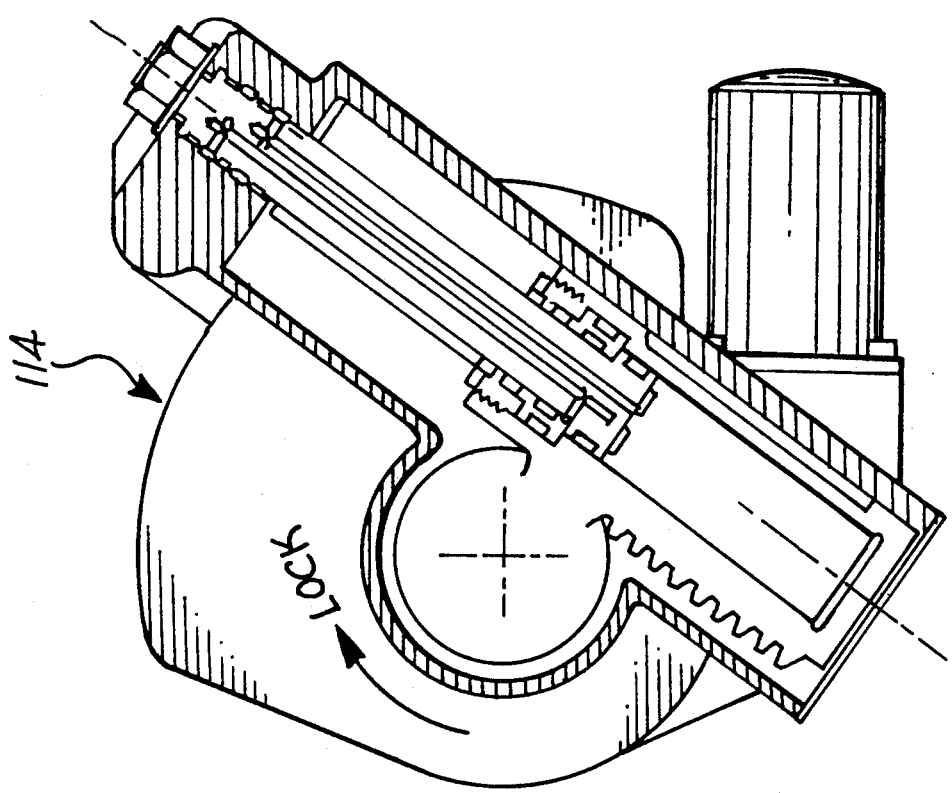
FIG. 18 is a view like FIG. 17, but shows the power drive unit in a rotated condition for unlocking the various latch pin units shown in FIGS. 2-4.
Figure 17:
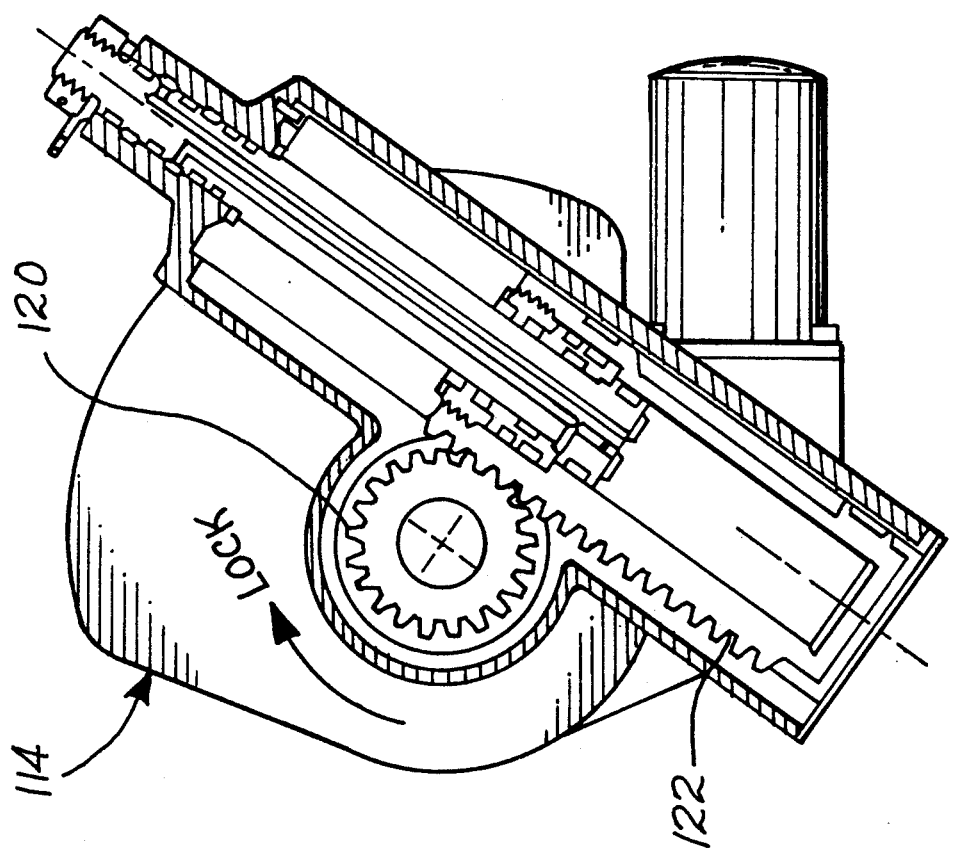
FIG. 17 is a cross-sectional view of the power drive unit shown in FIGS. 15 and 16, and i taken along line 17—17 in FIG. 16.

Folding and unfolding movement of the wing tip 12 relative to the wing inboard portion 16 is driven by a conventional, hydraulically-operated actuator 20, which is best seen in FIGS. 13 and 14. Directing attention there, and to FIG. 13 in particular, retraction of the actuator 20 pulls the wing tip downwardly, in the direction indicated by arrow 22, until the wing tip 12 is contiguous with the wing's inboard portion 16. In such position, both the tip 12 and the inboard portion 16 combine to form a single, continuous airfoil for flight. Conversely, extending the actuator 20, in the manner shown in FIG. 14, lifts or folds the wing tip 12. In accordance with the invention, this is done after the aircraft 10 has landed, so that its wing span will be reduced, making the aircraft better-suited for taxiing and parking adjacent other planes at an airport.

Figure 4:
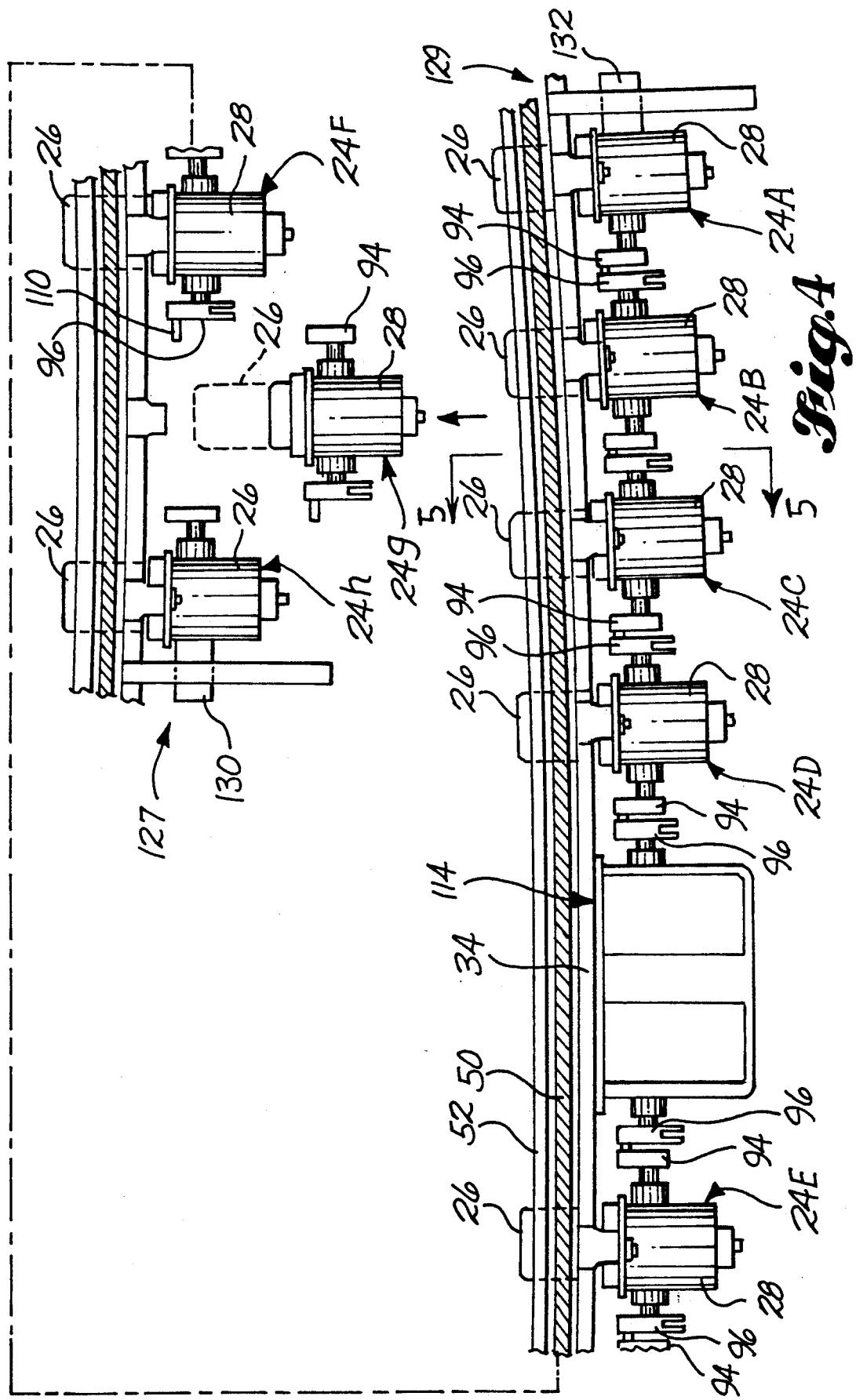
FIG. 4 is a side schematic showing a plurality of latch pin units for locking the hinge area shown in FIGS. 2 and 3.

The wing tip 12 is locked into the position shown in FIG. 13 by a plurality of latch pin units 24a-24h (see FIG. 4). It is presently anticipated that eight individual latch pin units will be the preferred number of units for locking the wing tips of a Boeing 777 having folding wing capability. However, further studies may reveal that a lesser or greater number of units my be more suitable. Since the number of latch pin units 24a-24h is not particularly germane to what is considered to be the invention here, other than the invention is designed to be used in connection with a plurality of at least two units, no further discussion will be presented as to why eight is the number of units shown in the drawings.

Figure 7:
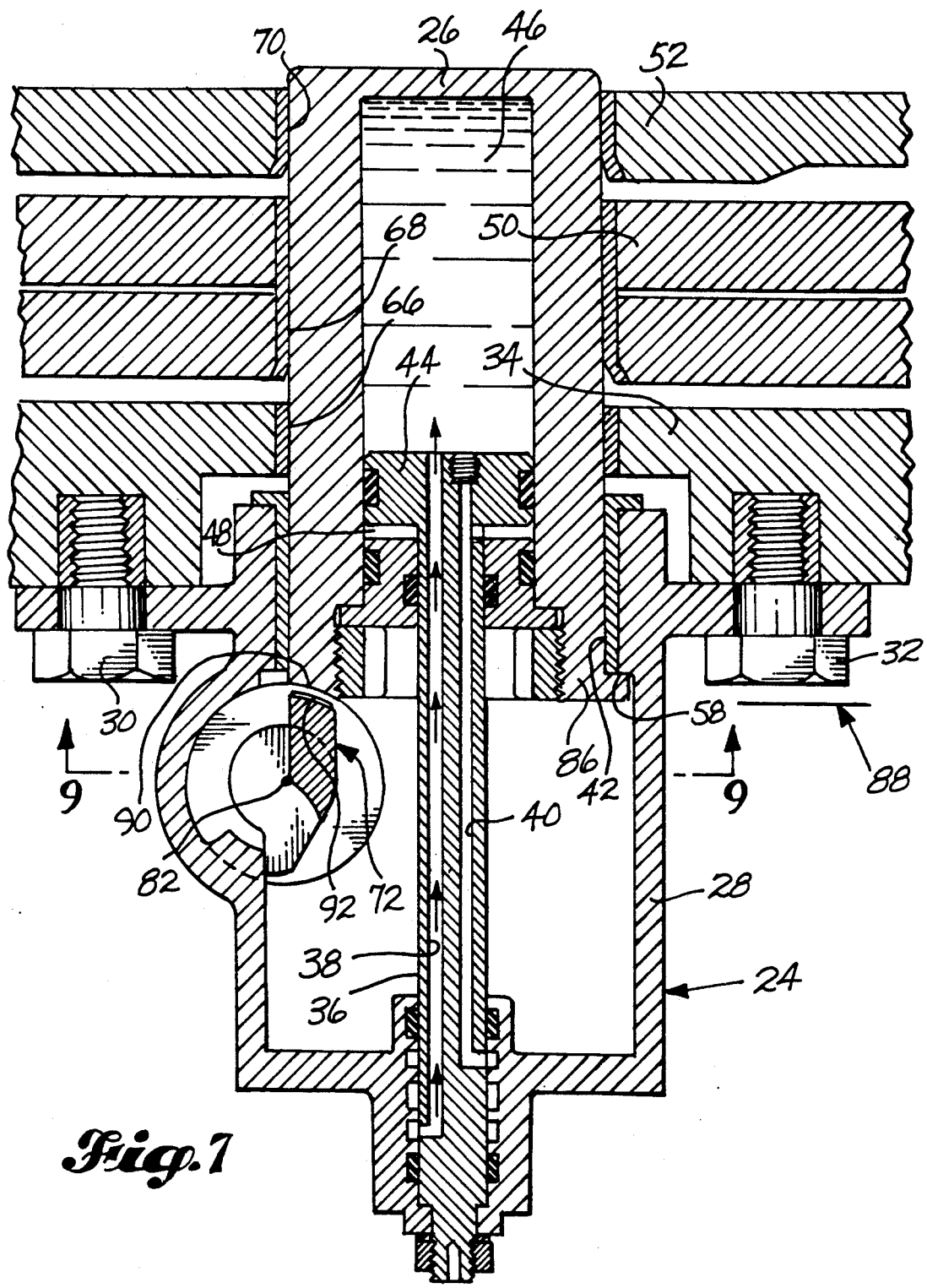
FIG. 7 is a cross-sectional view of the latch pin unit shown in FIG. 5, and illustrates the location of a unit locking member.
Figure 8:
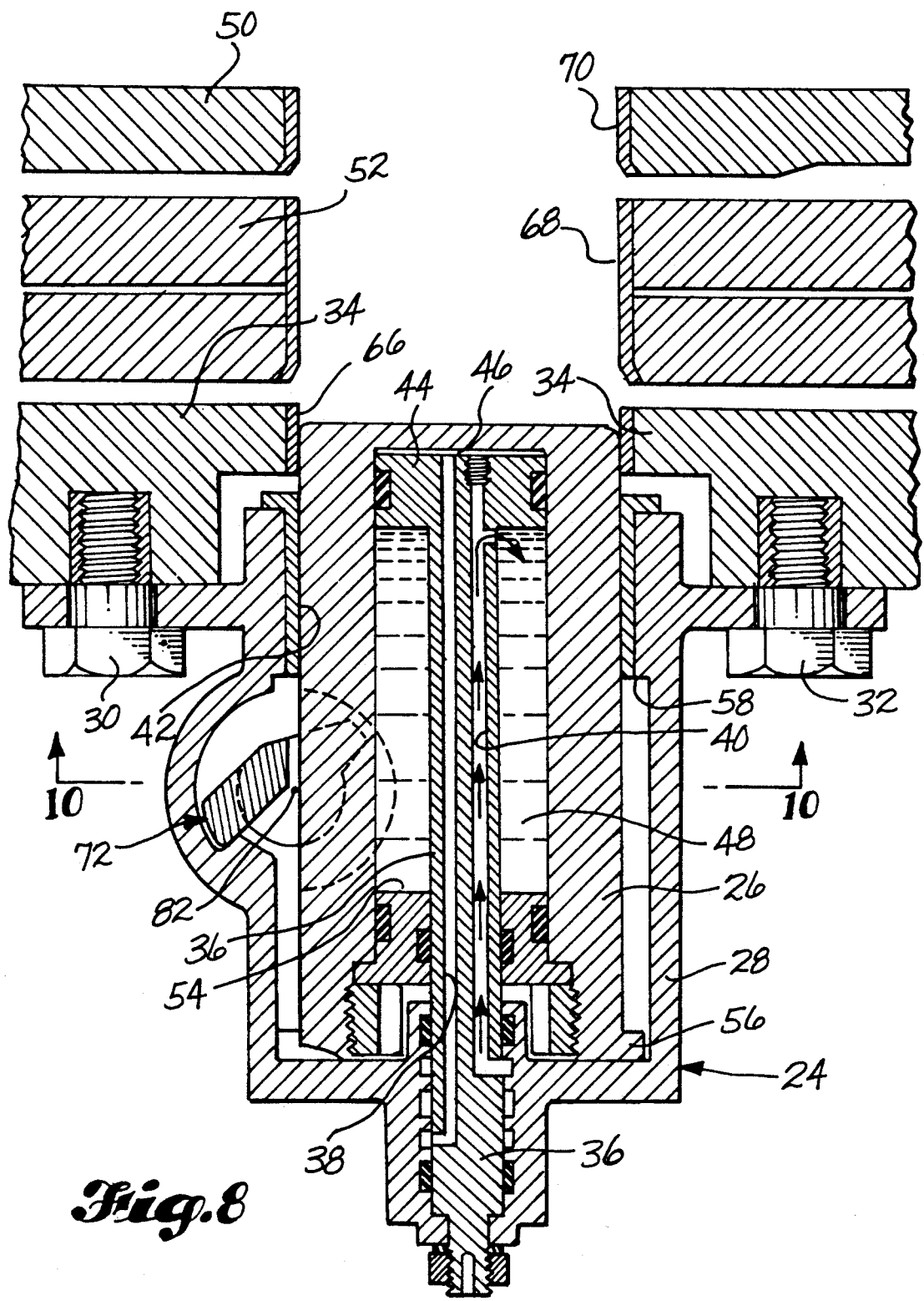
FIG. 8 is a view like FIG. 7, except that the latch pin is shown retracted.

The basic construction of each latch pin unit 24a-24h shown in FIG. 4 is best seen in FIGS. 7 and 8. The reader will readily understand that, since the latch pin unit 24 shown there is identical to the eight units 24a-24h shown in FIG. 4, the letter subscripts a through h have been dropped from these two figures.

Referring first to FIG. 8, each latch pin unit 24 has a latch pin 26 that is slidingly received within a latch pin housing 28. The latch pin housing 28 is mounted via bolts 30, 32, or similar means, to a first pin-hole frame 34, the latter being further described below.

The latch pin 26 is extended and retracted in and out of the pin housing 28 by hydraulic pressure. By way of example, fixedly connected to the pin housing 28 is a stem 36 that extends generally along the center-line axis of the housing 28. Such stem 36 is provided with internal fluid conduits 38, 40 for transmitting and receiving hydraulic fluid to and from each latch pin unit 24. Such fluid is transferred by a hydraulic system onboard the aircraft in a manner that is conventional.

The latch pin 26, which is also hollow, slides over the stem 36, the latter having a fixed piston portion 44 at its upper end. Piston 44 defines the interior of the latch pin 26 into two hydraulic chambers 46, 48, whose respective volumes vary in accordance with extension and retraction of the latch pin.

The latch pin 26 is extended relative to the pin housing 28 by supplying pressurized fluid through conduit 38. Delivery of pressurized hydraulic fluid through conduit 38 results in the pressurization of the outer chamber 46 on the upper side of piston 44. This causes the latch pin 26 to extend, not only through the first pin-hole frame 34 described above, but through second and third pin-hole frames 50, 52 as well. As will be further described below, the three pin-hole frames 34, 50, 52 make up part of the wing tip hinge structure 18. As is apparent from FIGS. 7 and 8, the latch pin 26 is generally cylindrical in outer shape, and slides within a generally cylindrical barrel portion 42 defined by the upper end of the pin housing 28.

Likewise, venting the pin's outer chamber 46 via conduit 38 while, at the same time, supplying pressurized fluid through conduit 40, causes the inner chamber 48 on the lower side of piston 44 to become pressurized. This pushes latch pin surface 54 (see FIG. 8) downwardly, expanding the size of inner chamber 48, and thereby retracting the latch pin 26.

Latch pin extension is stopped by an annularly-shaped flange 56 that extends around slightly more than 180° of the circumference of the pin (see FIG. 10). Such flange 56 abuts against an annular shoulder 58 inside the pin housing 28, in the manner shown in FIG. 7. The flange 56 does not extend all the way around the circumference of the latch pin 26 for locking reasons, which will become clearer in the description set forth below. The skilled person would also realize that, even if flange 56 was not present, pin retraction would be stopped by piston portion 44 in any event.

Referring now to FIG. 2, in what is presently believed to be the best mode for carrying out the invention, the various latch pin units 24a–24h are housed within a pod 60 that underlies both the tip 12 and inboard portion 16 of the wing. The first pin-hole frame 34 described above is fixedly connected to a suitable wing frame 62 (see FIGS. 5 and 6) on the wing's inboard portion 16. The third pin-hole frame 52 is likewise connected to the wing's inboard portion 16, but is spaced a certain distance above the first pin-hole frame 34.

The second pin-hole frame 50 is connected to wing frame structure on the wing tip, as shown at 64 in FIG. 5, and may be connected directly to the pivoting portion of hinge structure 18. The second pin-hole frame 50 swings down and in between the first and second pin-hole frames 34, 62 as the wing tip 12 is folded downwardly. In other words, it is sandwiched or juxaposed between the upper and lower pin-hole frames 34, 52 for interlocking the tip 12 and inboard portion 16.

The three pin-hole frames 34, 50, 52 have circular openings 66, 68, 70 that generally correspond to the outer diameter of the latch pin 26 of each latch pin unit 24a–24h. When the wing tip 12 is folded down, as shown in FIG. 5, these openings 66, 68, 70 move into registration and together define a cylindrical passageway for receiving the latch pin 26 as it extends. Extending the latch pin 26 thereby locks the three pin-hole frames 34, 50, 52 together, and thereby prevents the wing tip 12 from folding upwardly relative to the wing's inboard portion 16.

Referring now to FIGS. 9 and 10, the manner by which each latch pin 26 is locked in the extended position will now be described. Each latch pin unit 24 has a locking body or locking member, which is generally indicated at 72 in FIGS. 9 and 10. The locking body 72 has a pin-blocking portion 74 which extends transversely across an interior region 76 of the pin housing 28. A pair of axial outer ends 78, 80 extend outwardly from the pin housing 28, but on opposite sides. As is apparent from the drawings, these ends 78, 80 are fixedly connected to or are otherwise homogeneous with the pin-blocking portion 74, and rotate about the same axis 82 as the pin-blocking portion.

The pin-blocking portion 74 has a circular recess 84 which is sized and shaped to generally correspond to the outer curvature of the latch pin 26. Rotation of the locking body 72 correspondingly rotates the recess 84 between the pin-facing position shown in FIG. 10, and the blocking position shown in FIG. 9. When in the pin-facing position shown in FIG. 10, the recess 84 provides a pathway for permitting the latch pin 26 to pass by the locking body 72, in the manner shown in FIG. 8. Conversely, when the locking body 72 is rotated so that the recess 84 has the position shown in FIG. 9, the pin-blocking portion 74 of the locking body is completely and fully disposed over the latch pin thereby blocking latch pin movement. In other words, it would be impossible for the latch pin to retract unless the pin-blocking portion was either rotated, or completely broken. As is best seen in FIG. 10, it is preferable that the axis of rotation 82 of pin-blocking portion 74 intersects the circular arc defined by recess 84.

As is best seen in FIG. 7, the axis 82 about which the locking body 72 rotates is positioned inwardly of the outwardmost position of the inner end 86 of latch pin 26 when it is extended, the latter position being shown by the line identified generally by arrow 88 in FIG. 7. Thus, locking body 72 is positioned immediately inwardly of such position, and is rotatable only when the latch pin 26 is fully extended (i.e. at the position indicated by line 88). As shown in FIG. 7, the pin-blocking portion 74 of the locking body 80 is shaped, as shown at 90 in FIG. 7, so that it locks the pin 26 by presenting an abutting surface adjacent an edge 92 of the pin's inner end 86.

Rotating the locking body 72 takes the abutting surface 90 out of contact with latch pin edge 92 and rotates the recess 84 in the pin-blocking portion 74 into the position shown in FIG. 10, for latch pin retraction. Then, hydraulic fluid may be supplied to the latch pin 26 in the above-described manner, to retract it as shown in FIG. 8.

Referring briefly to FIG. 4, each latch pin unit 24a–24h is installable as a single unit, which facilitates maintenance in the event that replacement or repair of a single latch pin unit is required. Unit replacement is schematically indicated at 24g in FIG. 4, for example. Nevertheless, when all of the latch pin units 24a–24h are installed in pod 60, all of their respective locking bodies 72 are drivingly interconnected. This is accomplished by flange members 94, 96, which are respectively connected to the outer ends 78, 80 of each locking body.

Referring now to FIGS. 9 and 10, for example, the locking body 72 shown there has a first flange member 94 that is connected to another flange member 96, the latter being directly connected to the outer end 78 of another latch pin unit. Although the other latch pin unit is not shown in FIGS. 9 and 10, this type of connection is easy to see by referring to the plurality of units 24a–24h shown in FIG. 4.

Figure 11:
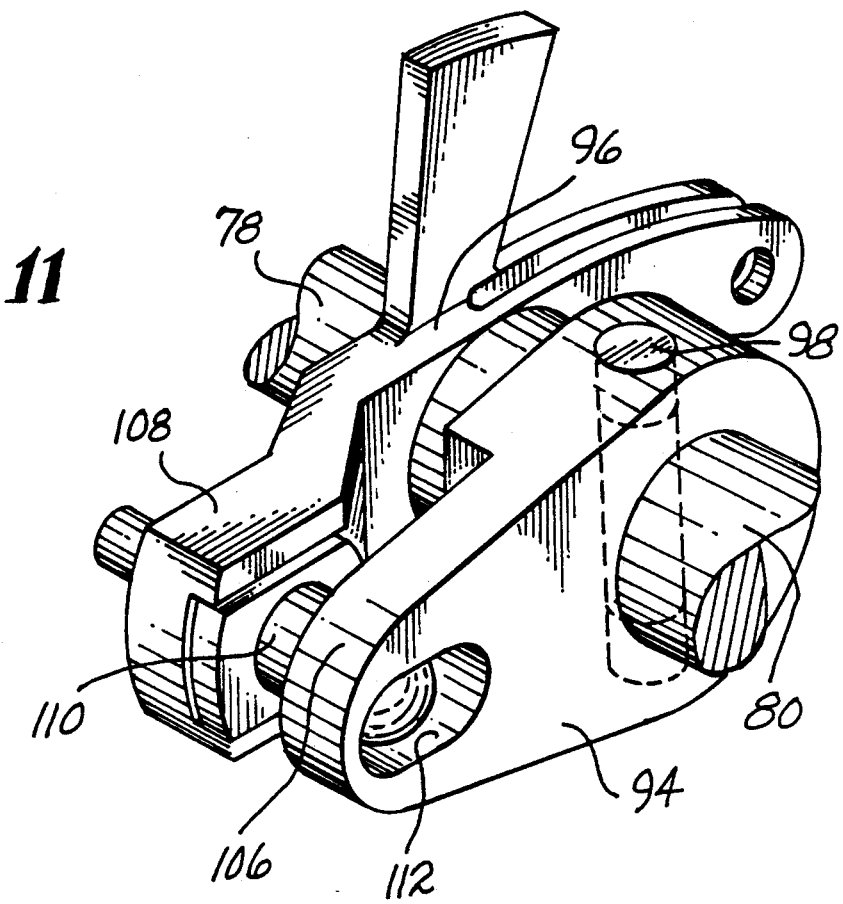
FIG. 11 is a pictorial view of a flange connection arrangement for interconnecting the locking body of one latch pin unit with the locking body of another latch pin unit.
Figure 12:
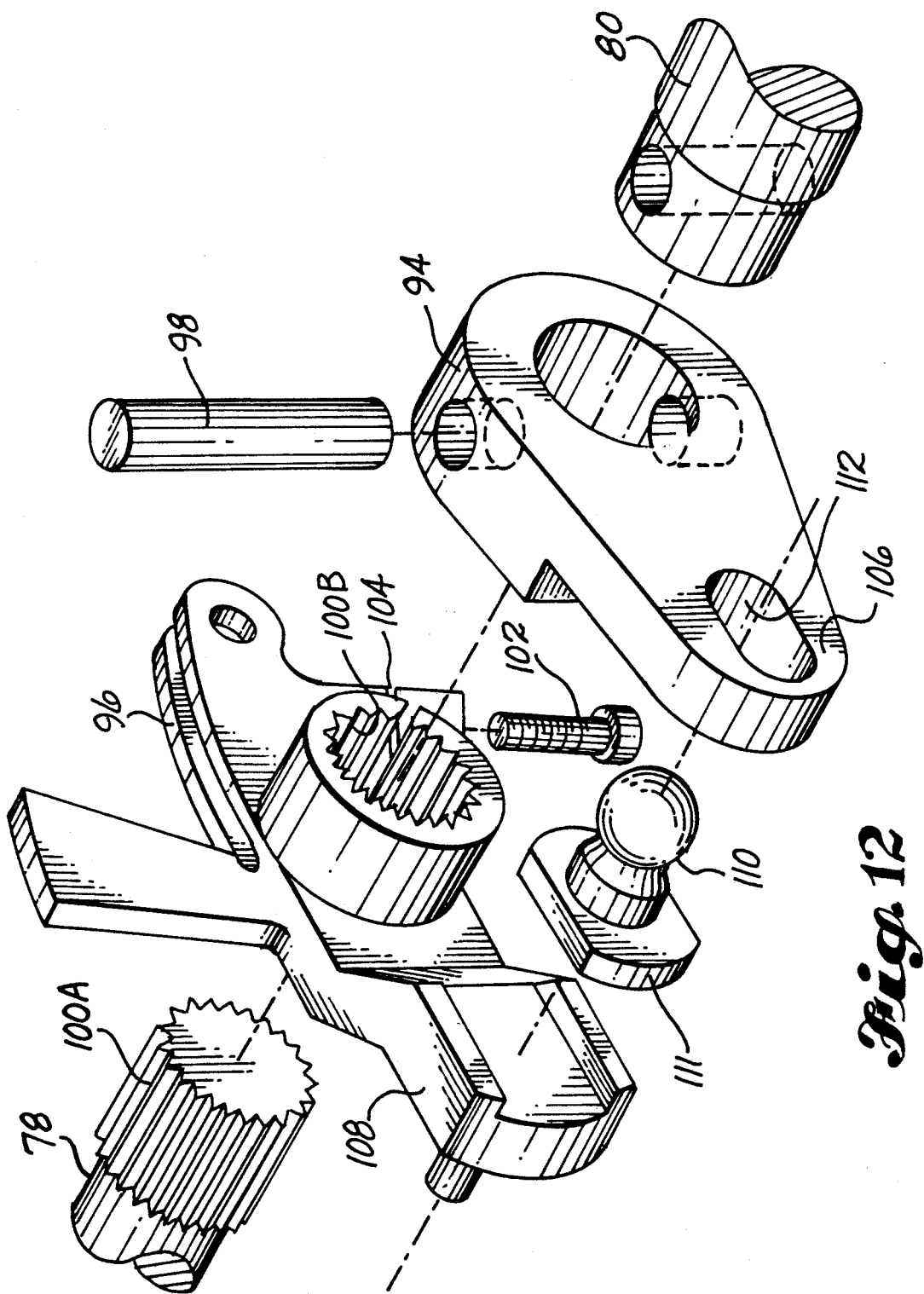
FIG. 12 is an exploded view of the flange connection arrangement shown in FIG. 11.

FIGS. 11 and 12 provide greater detail on how the above-described flange connection is made. Directing attention there, the first flange member 94 is connected to one locking body outer axial end 80 by a conventional pin connection 98. The second flange member 96 is connected to the end 78 of the other locking body, by a spline connection 100a, 100b where the flange 96 is fixed in position by a conventional screw 102 that tightens a split portion 104 of the flange 96 around spline 100a. The first flange 94 has a portion 106 which projects transversely relative to locking body axial end 80. Likewise, the second flange 96 has a similar transversely-extending portion 108. A pin 110 is shown as being fixedly connected to one or the other of flange portions 106, 108. In FIG. 12, one end of the pin is shown as being fixedly connected to flange portion 108, for example. Such pin 110 extends across the gap between flange portions 106, 108, and into an opening 112 in flange portion 106. In this manner, the two flange portions 106, 108, and hence, the first and second flanges 94, 96, link their respective locking bodies together.

Referring again to FIG. 4, in preferred form, the eight latch pin units 24a-24h shown there are divided into two sets. A first set of four units 24a-24d is positioned on one side of a power drive unit (PDU), which is generally indicated at 114. The second set 24e-24h is located on the other side of the PDU 114. The PDU 114 is connected to the interlinked locking bodies of each set and drives them in locking or unlocking rotation simultaneously. Referring now to FIGS. 15-19, the PDU 114 will now be described in greater detail.

The PDU 114 has opposite ends 116, 118 that are respectively connected to each set of latch pin units 24a-24d and 24e-24h. Basically, the PDU has a conventional rack and pinion gear drive (see FIGS. 17 and 18), which simultaneously drives both shafts 116, 118. In other words, pinion gear 120 (see FIG. 17) linearly translates rack gear 122. This in turn rotates shaft 116 and 118. A conventional differential drive, indicated generally at 124, mechanically links the rack and pinion drive 120, 122 to shaft ends 116, 118.

In order to avoid any misunderstanding as to how the invention disclosed here is to be implemented, it should be mentioned at this point that the locking system or locking body arrangement described above is presently intended to be used as a secondary locking system on the Boeing 777. In other words, each latch pin unit 24a-24h described above may also be provided with a primary lock. The primary lock would probably lock and function in much the same manner as the locking body 72 of each latch pin unit 24 described above. However, it is anticipated that such primary lock would stand alone and by itself. In other words, it would not be engaged or linked to the primary lock of another latch pin unit, nor would its locking action be dependent on the rotation of another primary lock It is anticipated that the primary lock of each latch pin unit 24 will be locked and/or unlocked independently of the other, and may interlock with the secondary locking system as disclosed here. As such, the secondary locking system described and claimed here would indicate to the flight crew whether or not wing locking and latching is accomplished properly.

The locking system disclosed here would provide a back-up to individual primary locks, and would provide fail-safe redundancy at a level which has not been accomplished in the past. The location of the primary lock in each latch pin unit 24a-24h is indicated generally at 126 in FIGS. 5 and 6. It may have a flange 128 that engages or interlocks with one of the flange members 96 described above, when both it and the secondary lock are locked at the same time.

The locking mechanism in accordance with the invention is designed to broadcast its own failure and thereby protect against a false lock indication or enunciation to the flight crew. As with the primary lock interlocking capability generally described above, sensors would indicate to the flight crew whether or not the secondary locks were properly engaged. Referring again to FIG. 4, essentially all of the locking bodies 72 of the various latch pin units 24a-24h in combination with PDU 114, define a single rod or branchless network of secondary locks extending from one side 127 of hinge structure 18 to the other side 129.

Conventional rotation sensors 130, 132 are mounted at each end of such network, and each provides an electrical signal indicating network rotation. If the signals from sensors 130, 132 match, then it is known that the entire network has rotated. However, in the event that any one locking body 72 in the network breaks, then a discontinuity is created in the network, and the signals emanating from sensors 130, 132, would not match. This, in turn, would indicate a lock failure and create a requirement for maintenance in order to determine the cause of the failure.

In the event a single locking body 72 in the network fails, any locking bodies downstream of such failure are prevented from rotating, because they are no longer drivingly connected to the PDU 114. Thus, if a lock failed during flight, downstream latch pins would be prevented from unlocking. By way of example, and referring again to FIG. 4, if the locking body 72 in latch pin unit 24d broke, then downstream latch pin units 24a-24c would be prevented from retracting.

FIG. 19 shows an alternative embodiment of the invention where the latch pins 24a-24h are positioned within the envelope defined by wing inboard portion 16. In other words, rather than the latch pin units 24a-24h being located in a pod 60 that is below the wing, as shown in FIGS. 13 and 14, for example, the pod is eliminated and the latch pin units are located or housed within the wing itself.

Figure 20:
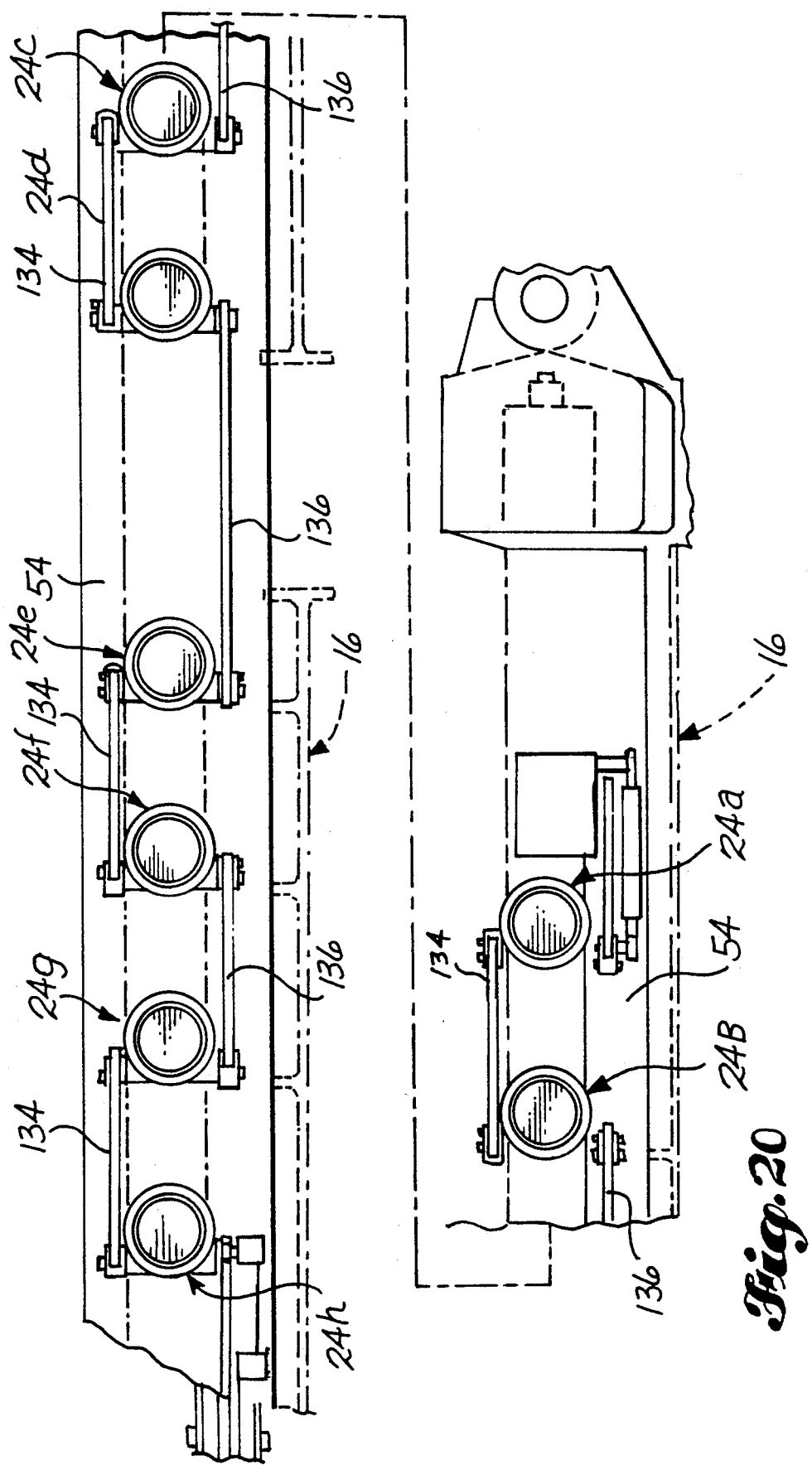
FIG. 20 is a top plan view of the embodiment shown in FIG. 19.

The embodiment shown in FIGS. 19 and 20 also disclose a different method or means for connecting the locking body of one latch pin unit with another. Referring to FIG. 20 in particular, the locking body 72 of each latch pin unit 24 is connected, one to the other, by side arms or linkages 134, 136. As the reader will further appreciate, the locking bodies 72 of the latch pin unit shown in the FIG. 19 embodiment are rotated 90° with respect to their position shown in FIGS. 9 and 10. This is necessary in order to accommodate the kind of linkages provided by link arms 134, 136.

Figures 21, 22:
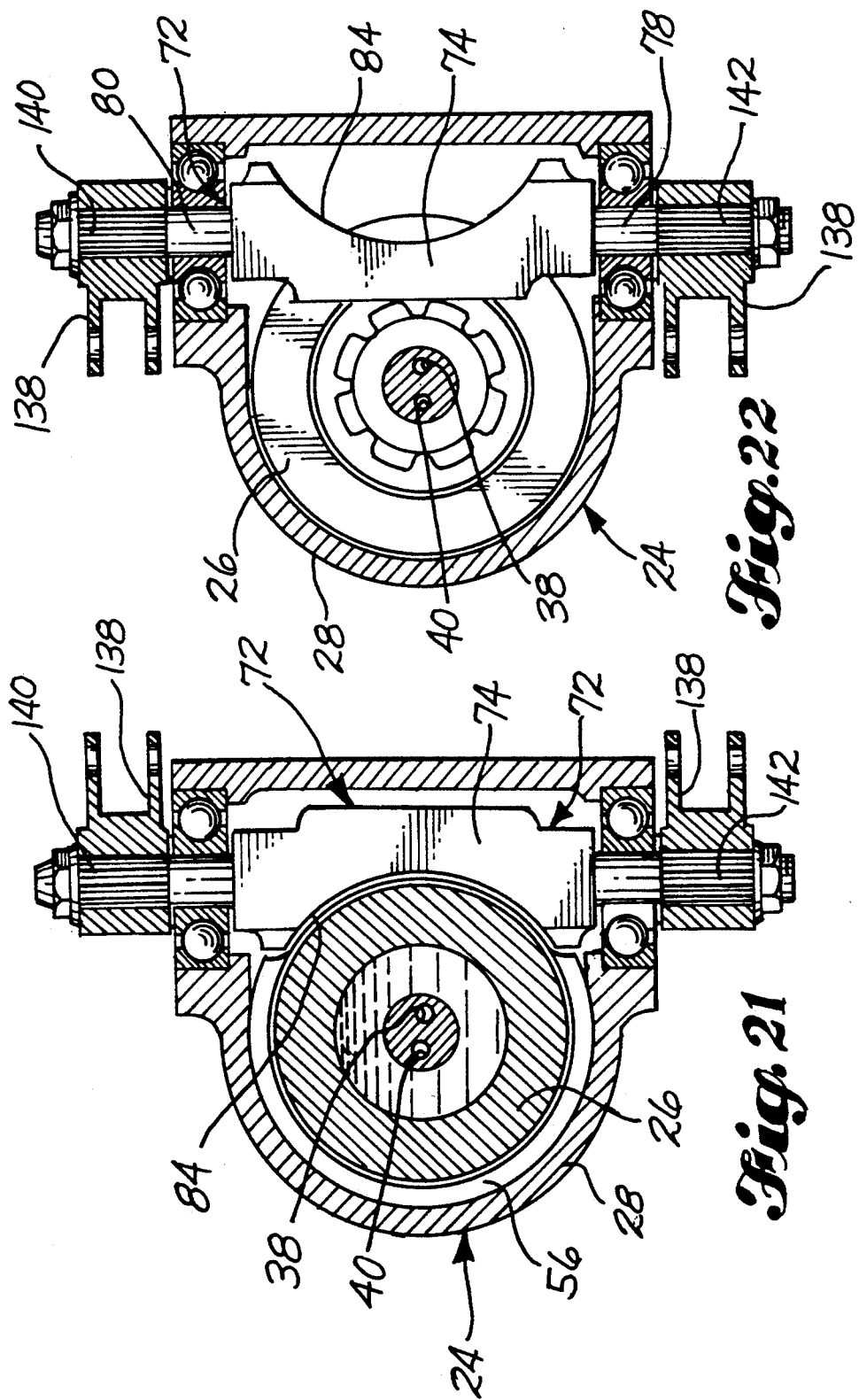
FIG. 21 is a cross-sectional view that is similar to the view shown in FIG. 9, but is for the embodiment shown in FIGS. 19 and 20.
FIG. 22 is a cross-sectional view similar to FIG. 21, but is for the alternative embodiment shown in FIGS. 19 and 20.

Each locking body in the second embodiment has a downwardly-extending flange arm 138 (see FIG. 19) which is pivotally connected to the end of a swing linkage 134, 136. Such arms 138 are connected to the outer axial ends of the locking bodies 78, 80 by spline connections, as shown at 140, 142 in FIGS. 21-22, or by similar means. In all other respects, the locking bodies of the FIG. 19 latch pin units operate in the same way as that which was described above.

It is to be appreciated that the preceding description sets forth the best mode for carrying out what is considered to be the invention, at least as it is presently known. As mentioned above, the latch pin and locking system disclosed here may be best suited for use as a secondary locking system, rather than a primary one. Nevertheless, further development may show that it is well-suited for use as a primary locking system, not only on commercial aircraft, but on military aircraft as well. For this reason, it is to be understood that further development of the invention may be made, possibly resulting in new embodiments that vary from what has been disclosed here. Consequently, the invention is not to be defined by the preceding description. Rather, it is to be defined by the subjoined patent claim or claims, the interpretation of which is to be made in accordance with the well-established doctrines of patent claim interpretation.

What is claimed is:

1. For use on an aircraft having folding wing tips, where an end portion of each aircraft wing is hingedly connected to an inboard portion of said wing, in a manner so that said end portion is swingable between an extended position, where it and said inboard portion together form a contiguous airfoil for aircraft flight, and a folded position, for reducing the total wing span of said aircraft when it is on the ground, a wing tip latch pin and locking unit, comprising:

a pin housing that is mountable to one of said wing portions, and a latch pin that is generally cylindrical in shape and reciprocatably movable between an extended and retracted condition relative to said pin housing, said latch pin having an outer end portion that projects outwardly of said pin housing, at least when said latch pin is in said extended condition, and an inner end portion that is slidably received within said pin housing and travels back and forth therein in correspondence with extension and retraction of said latch pin, and a locking body that extends through a portion of said pin housing, said locking body having a pin-blocking portion that is rotatable about an axis between locked and unlocked positions, said locking body being positioned immediately inwardly of the outwardmost position of said latch pin inner end portion when said latch pin is in said extended condition, at least a portion of said pin-blocking portion being fully disposed across the path of travel of said latch pin inner end portion when said pin-blocking portion is rotated into said locked position.

2. The latch pin and locking unit of claim 1, wherein said pin-blocking portion has a circular recess that is sized to have the same general curvature as the outer surface of said latch pin, in a manner so that when said pin-blocking portion is rotated to said unlocked position, said recess provides a pathway that permits said latch pin to pass by said pin-blocking portion as said latch pin retracts.

3. The latch pin and locking unit of claim 2, wherein said recess in said pin-blocking portion is shaped in a manner so as to define a circular arc, said arc being intersected by said axis about which said pin-blocking portion rotates.

4. The latch pin and locking unit of claim 1, including connecting means for linking said locking body of said unit with the locking body of a second latch pin and locking unit.

5. The latch pin and locking unit of claim 4, wherein said connecting means includes a first flange member connected to an outer end of said locking body, said outer end projecting outwardly from said pin housing, and rotating correspondingly with rotation of said pin-blocking portion, and a second flange member connected to an outer end of the locking body of said second latch pin and locking unit, and a pin member drivingly interconnecting said first and second flange members.

6. The latch pin and locking unit of claim 5, wherein said pin member has an end fixedly connected to one of said flange members, and has another end extending into an opening in said other flange member, for drivingly interconnecting said flange members.

7. The latch pin and locking unit of claim 3, including connecting means for linking said locking body of said unit with the locking body of a second latch pin and locking unit.

8. The latch pin and locking unit of claim 7, wherein said connecting means includes a first flange member connected to an outer end of said locking body, said outer end projecting outwardly from said pin housing, and rotating correspondingly with rotation of said pin-blocking portion, and a second flange member connected to an outer end of the locking body of said second latch pin and locking unit, and a pin member drivingly interconnecting said first and second flange members.

9. The latch pin and locking unit of claim 8, wherein said pin member has an end fixedly connected to one of said flange members, and has another end extending into an opening in said other flange member, for drivingly interconnecting said flange members.

* * * * *

UNITED STATES PATENT AND TRADEMARK OFFICE
CERTIFICATE OF CORRECTION

PATENT NO. : 5,201,479

DATED : April 13, 1993

INVENTOR(S) : Michael E. Renzelmann

It is certified that error appears in the above–identified patent and that said Letters Patent is hereby corrected as shown below:

On the Title Page:

In Section [56], U.S. PATENT DOCUMENTS, "2,112,421" should be
   -- 2,712,421 --.
Column 3, line 1, there is a period after "design".
Column 3, lines 34 and 48, "contiguous" should be
   -- continuous --.
Column 5, line 18, "i" should be -- is --.
Column 5, line 28, "Fig. 9" should be -- Fig. 10 --.
Column 5, line 30, "Fig. 21" should be -- Fig. 9 --.
Column 5, lines 39 and 40, "12a, 12b" should be -- 12A, 12B --.
Column 5, line 43, "14a, 14b" should be -- 14A, 14B --.
Column 5, line 45, "16a, 16b" should be -- 16A, 16B --.
Column 5, line 52, "Of" should be -- of --.
Column 5, line 59, "subscripts "a" and "b"" should be
   -- designations "A" and "B" --.
Column 6, ilne 27, "subscripts" should be -- designations --.
Column 7, line 30, "34, 62" should be -- 34, 52 --.
Column 8, line 8, "intersects" should be -- intersect --.
Column 8, line 18, "80" should be -- 72 --.
Column 8, lines 19 and 23, "90" should be -- 92 --.

UNITED STATES PATENT AND TRADEMARK OFFICE
CERTIFICATE OF CORRECTION

PATENT NO. : 5,201,479
DATED : April 13, 1993
INVENTOR(S) : Michael E. Renzelmann It is certified that error appears in the above-identified patent and that said Letters Patent is hereby corrected as shown below:

Column 8, lines 20 and 23, "92" should be -- 90 --.
Column 8, line 38, "78, 80" should be -- 80, 78 --.
Column 8, line 53, "100a, 100b" should be -- 100A, 100B --.
Column 8, line 56, "100a" should be -- 100A --.
Column 8, line 61, after "one end", insert -- 111 --.
Column 9, line 17, "shaft" should be -- shafts --.
Column 9, line 35, there is a period after "lock".
Column 10, line 25, "disclose" should be -- discloses --.
Claim 1, column 10, line 68, "contiguous" should be
    -- continuous --.
Claim 1, column 11, line 7, "extended and retracted" should be
    -- extended condition and a retracted --.

Signed and Sealed this

Fourth Day of October, 1994

Attest:

BRUCE LEHMAN

Attesting Officer

Commissioner of Patents and Trademarks